US012651806B2

(12) United States Patent
Son et al.

(10) Patent No.: US 12,651,806 B2
(45) Date of Patent: Jun. 9, 2026

(54) ELECTRODE ASSEMBLY AND SECONDARY BATTERY INCLUDING THE SAME

(71) Applicant: LG Energy Solution, Ltd., Seoul (KR)

(72) Inventors: Gilsang Son, Daejeon (KR); Dongyeon Kim, Daejeon (KR); Jinhak Kong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 793 days.

(21) Appl. No.: 17/921,468

(22) PCT Filed: Sep. 27, 2021

(86) PCT No.: PCT/KR2021/013100
§ 371 (c)(1),
(2) Date: Oct. 26, 2022

(87) PCT Pub. No.: WO2022/114487
PCT Pub. Date: Jun. 2, 2022

(65) Prior Publication Data
US 2023/0268619 A1 Aug. 24, 2023

(30) Foreign Application Priority Data

Nov. 26, 2020 (KR) ........................ 10-2020-0161172

(51) Int. Cl.
*H01M 50/533* (2021.01)
(52) U.S. Cl.
CPC ................................. *H01M 50/533* (2021.01)
(58) Field of Classification Search
CPC ................................................ H01M 50/533
See application file for complete search history.

(56) References Cited

U.S. PATENT DOCUMENTS

| | | | |
|---|---|---|---|
| 2010/0167111 A1 | 7/2010 | Sumihara et al. | |
| 2010/0285353 A1 | 11/2010 | Katayama et al. | |
| 2012/0064382 A1 | 3/2012 | Ahn | |
| 2012/0321931 A1* | 12/2012 | Ahn | H01M 50/536 |
| | | | 429/144 |

(Continued)

FOREIGN PATENT DOCUMENTS

| | | |
|---|---|---|
| CN | 101512800 A | 8/2009 |
| CN | 102027619 A | 4/2011 |

(Continued)

OTHER PUBLICATIONS

Search Report dated Apr. 22, 2024 from the Office Action for Chinese Application No. 202180030467.9 Issued Apr. 25, 2024, pp. 1-3.

(Continued)

*Primary Examiner* — Olatunji A Godo
(74) *Attorney, Agent, or Firm* — Lerner David LLP

(57) ABSTRACT

An electrode assembly according to one exemplary embodiment of the present disclosure includes a unit cell including a positive electrode plate, a separator and a negative electrode plate, an electrode tab that is protruded from at least one of the positive electrode plate and the negative electrode plate, and an electrode lead that is connected to the electrode tab, wherein an elliptical hole is formed in a portion of the electrode tab adjacent to an overlapping portion of the electrode tab and the electrode lead.

9 Claims, 3 Drawing Sheets

(56)  References Cited

U.S. PATENT DOCUMENTS

| | | |
|---|---|---|
| 2015/0162590 A1 | 6/2015 | Takahashi |
| 2017/0092928 A1* | 3/2017 | Wakimoto .......... H01M 50/119 |
| 2018/0198106 A1 | 7/2018 | Takahashi |
| 2018/0269458 A1 | 9/2018 | Oh et al. |
| 2020/0212495 A1 | 7/2020 | Lee |
| 2022/0384922 A1 | 12/2022 | Lee et al. |
| 2023/0290927 A1 | 9/2023 | Lilley et al. |

FOREIGN PATENT DOCUMENTS

| | | |
|---|---|---|
| CN | 103999261 A | 8/2014 |
| JP | 2000243374 A | 9/2000 |
| JP | 2001338688 A | 12/2001 |
| JP | 2010165495 A | 7/2010 |
| JP | 2013093498 A | 5/2013 |
| JP | 2015130329 A | 7/2015 |
| JP | 2017188371 A | 10/2017 |
| JP | 2018041819 A | 3/2018 |
| JP | 2018534737 A | 11/2018 |
| KR | 101199215 B1 | 11/2012 |
| KR | 20130050654 A | 5/2013 |
| KR | 20130064228 A | 6/2013 |
| KR | 20130122998 A | 11/2013 |
| KR | 20150043093 A | 4/2015 |
| KR | 20190024451 A | 3/2019 |
| KR | 20190026627 A | 3/2019 |
| KR | 20190030973 A | 3/2019 |
| KR | 102107000 B1 | 5/2020 |
| WO | 2017174374 A1 | 10/2017 |
| WO | 2021118209 A1 | 6/2021 |

OTHER PUBLICATIONS

Extended European Search Report including Written Opinion for Application No. 21898314.6 dated Oct. 27, 2023, pp. 1-8.
International Search Report for PCT/KR2021/013100 mailed Jan. 3, 2022. 3 pgs.

* cited by examiner

【FIG. 1】
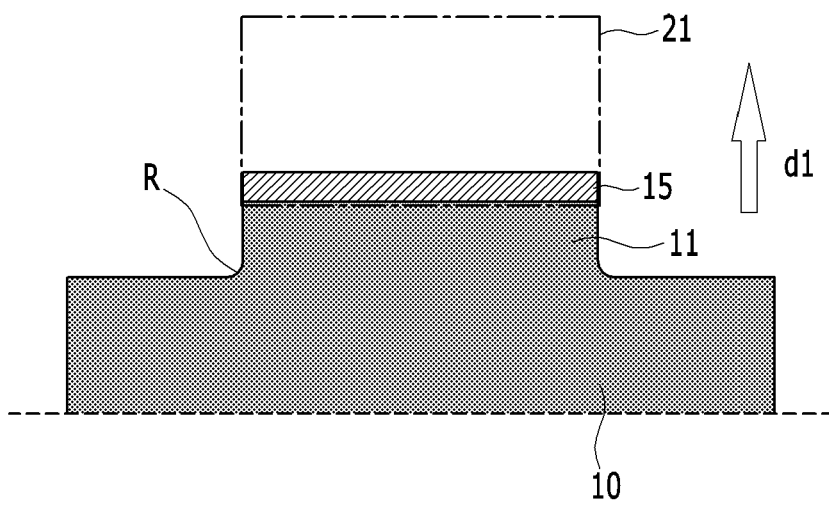
【FIG. 2】
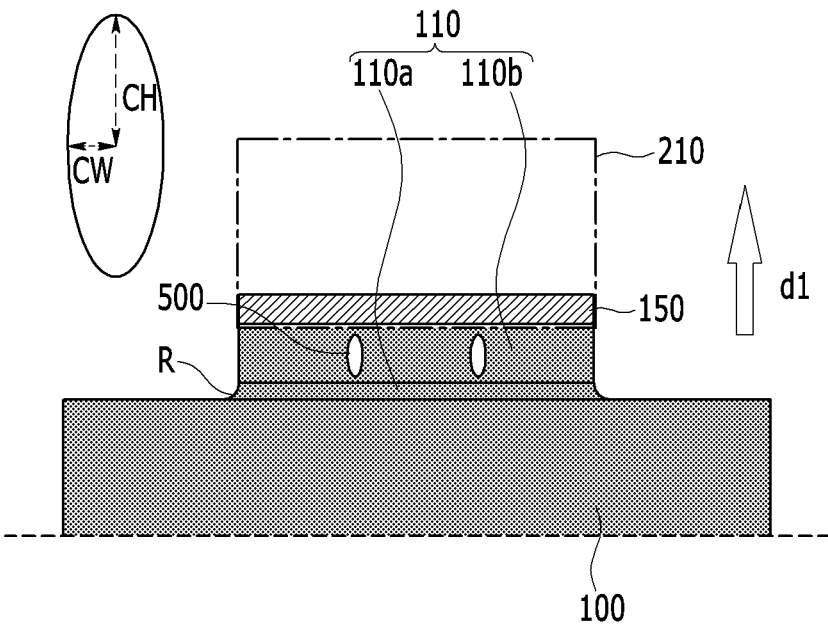

【FIG. 3】
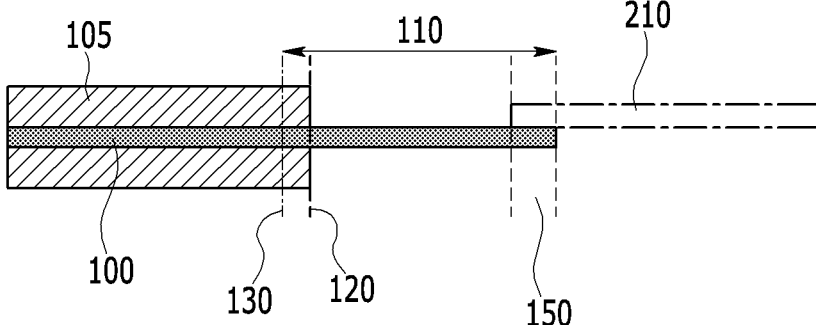
【FIG. 4】
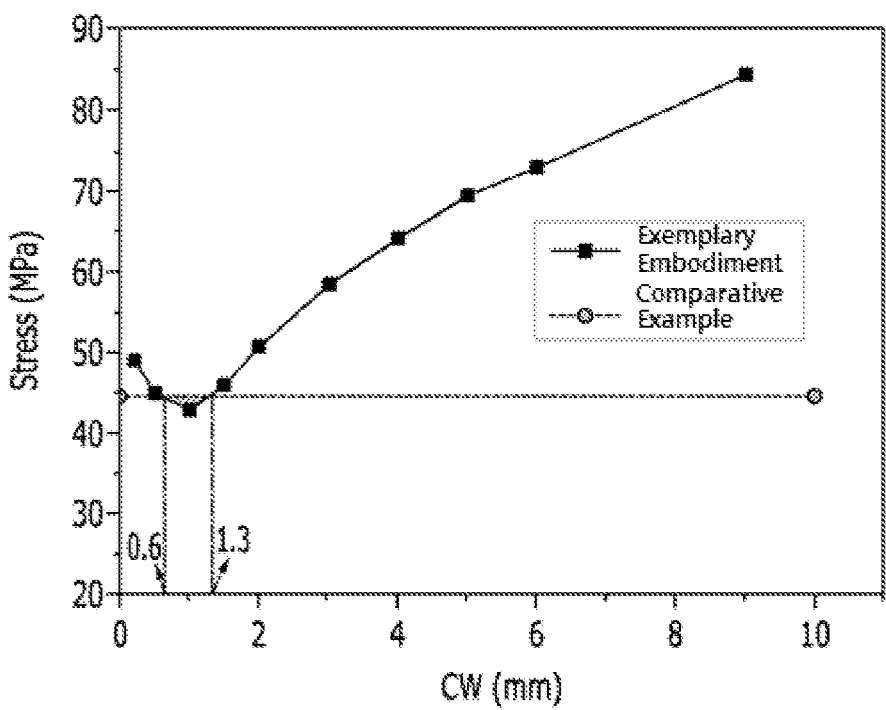

【FIG. 5】
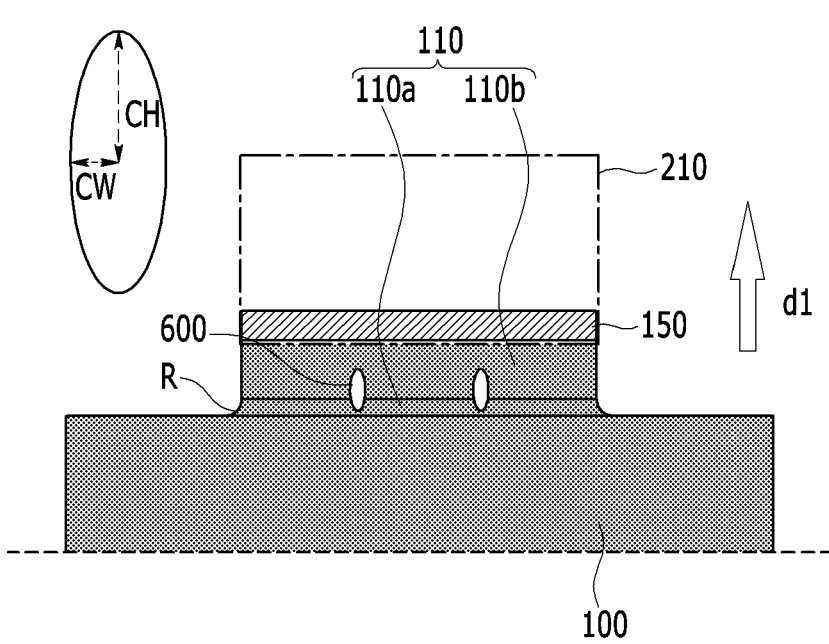

ELECTRODE ASSEMBLY AND SECONDARY BATTERY INCLUDING THE SAME

CROSS-REFERENCE TO RELATED APPLICATIONS

This application is a national stage entry under 35 U.S.C. § 371 of International Application No. PCT/KR2021/013100, filed on Sep. 27, 2021, which claims priority to Korean Patent Application No. 10-2020-0161172, filed on Nov. 26, 2020, the entire disclosures of which are incorporated herein by reference in their entireties.

TECHNICAL FIELD

The present disclosure relates to an electrode assembly and a secondary battery including the same, and more particularly, to an electrode assembly containing a robust electrode tab, and a secondary battery including the same.

BACKGROUND

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, as technology development and demands for mobile devices increase, the demand for batteries as energy sources is rapidly increasing. Accordingly, many researches on batteries capable of meeting diverse demands have been conducted.

Typically, the demand for the lithium secondary battery, such as a lithium ion battery or a lithium ion polymer battery, which have advantages such as a high energy density, a discharge voltage, an output stability, and the like is high.

Based on the shape of a battery case, such a secondary battery is classified into a cylindrical battery where an electrode assembly is built into a cylindrical metal can, a prismatic battery where an electrode assembly is built into a prismatic metal can, and a pouch type battery where an electrode assembly is built into a pouch type case formed of an aluminum laminate sheet.

The pouch type secondary battery may cause a disconnection of an electrode tab due to an external force in the manufacturing process such as a process of gathering a plurality of electrode tabs into one, or a process of welding electrode tab bundles with metal leads to electrically connect them to the outside, and internal force according to a change in the volume of the electrode during charging/discharging. Additionally, the strength of the pouch type secondary battery case is weak, which may be exposed to problems of stability due to external impact.

Generally, the electrode tab includes a plurality of positive electrode tabs and negative electrode tabs protruding from a positive electrode plate and a negative electrode plate of each unit cell. Since the positive electrode tab and the negative electrode tab are made of a very thin metal thin film, similarly to the positive electrode plate and negative electrode plate, there is a high possibility of being disconnected before other components when an impact is applied to the pouch type secondary battery.

Therefore, there is a need to develop an electrode tab that is more robust against disconnection due to stress caused by internal/external force occurring during the manufacturing process, connection process, and use, as compared with a conventional electrode tab.

DETAILED DESCRIPTION OF THE INVENTION

Technical Problem

It is an object of the present disclosure to provide an electrode assembly containing a robust electrode tab and a secondary battery comprising the same.

The objects of the present disclosure are not limited to the aforementioned objects, and other objects which are not described herein should be clearly understood by those skilled in the art from the following detailed description.

Technical Solution

In order to achieve the above object, according to one exemplary embodiment of the present disclosure, there is provided an electrode assembly comprising: a unit cell including a positive electrode plate, a separator and a negative electrode plate, an electrode tab that is protruded from at least one of the positive electrode plate and the negative electrode plate, and an electrode lead that is connected to the electrode tab, wherein an elliptical hole is formed in a portion of the electrode tab adjacent to an overlapping portion of the electrode tab and the electrode lead.

The hole may have an elliptical shape with a long axis in a direction in which the electrode tab protrudes.

The electrode tab may comprise a first electrode tab portion to which an electrode active material is applied to the electrode plate, and a second electrode tab portion to which the electrode active material is not applied.

The second electrode tab portion may be connected to the electrode lead.

Right and left side edges of the first electrode tab portion may be formed in a curved line shape.

The hole may be formed in the second electrode tab portion.

The hole may be extended from the second electrode tab portion and formed over the first electrode tab portion and the second electrode tab portion.

The hole may be formed by a plurality of numbers in a width direction of the electrode tab.

A ratio of a length in a width direction (CW) to a length in a longitudinal direction (CH) of the hole may be 0.2 to 0.4333.

According to another exemplary embodiment of the present disclosure, there is provided a secondary battery comprising the above-mentioned electrode assembly.

Advantageous Effects

The exemplary embodiments of the present disclosure can implement the electrode tab including the hole, thereby reducing the initial crack resistance due to internal/external forces and at the same time, delaying the progress of cracks and making it difficult to reach complete disconnection, thereby improving the occurrence of disconnection.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a plan view showing an electrode assembly according to a comparative example of the present disclosure;

FIG. 2 is a plan view showing an electrode assembly according to an exemplary embodiment of the present disclosure;

FIG. 3 is a cross-sectional view of FIG. 2 in a first direction;

FIG. 4 is a graph for comparing the maximum stress value in the tab according to a comparative example and an exemplary embodiment of the present disclosure; and FIG. 5 is a plan view showing a modification of the exemplary embodiment of FIG. 2.

DETAILED DESCRIPTION OF THE EXEMPLARY EMBODIMENTS

Hereinafter, various exemplary embodiments of the present disclosure will be described in detail with reference to the accompanying drawings so that those skilled in the art can easily carry out them. The present disclosure may be modified in various different ways, and is not limited to the exemplary embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 1 is a plan view showing an electrode assembly according to a comparative example of the present disclosure, FIG. 2 is a plan view showing an electrode assembly according to an exemplary embodiment of the present disclosure. FIG. 3 is a cross-sectional view of FIG. 2 in a first direction.

Referring to FIG. 1, the electrode assembly according to one exemplary embodiment of the present disclosure includes an electrode plate 10, an electrode tab 11 that is protruded from the electrode plate 10, and an electrode lead 21 that is connected to the electrode tab 11. The electrode tab 11 and the electrode lead 21 may be connected to each other via welding or the like at the overlapping portion 15. The electrode tab 11 and the electrode lead 21 are electrically connected to each other. A phenomenon may occur in which the electrode tab 11 is disconnected due to a process for connecting them, a process of connecting or fixing the electrode lead 21 to the external frame, or periodic charging and discharging of the pouch type battery.

Referring to FIG. 2, the electrode assembly according to the exemplary embodiment of the present disclosure includes an electrode plate 100, an electrode tab 110 that is protruded from the electrode plate 100 in the first direction d1, and an electrode lead 210 that is connected to the electrode tab 110. The electrode assembly includes a unit cell including a positive electrode plate, a separator and a negative electrode plate, and the electrode plate 100 according to the exemplary embodiment of the present disclosure may be at least one of the positive electrode plate and the negative electrode plate.

According to the exemplary embodiment of the present disclosure, one end of the electrode tab 110 and one end of the electrode lead 210 can overlap to form an overlapping portion 150, and in the overlapping portion 150, the electrode tab 110 and the electrode lead 210 can be connected to each other by welding or the like to form a connection portion. An elliptical hole 500 is formed in a portion of the electrode tab 110 adjacent to the overlapping portion 150 according to the exemplary embodiment of the present disclosure. At this time, the hole 500 preferably has an elliptical shape with a long axis in the first direction d1, which is the direction in which the electrode tab 110 protrudes. In other words, the hole 500 according to the exemplary embodiment of the present disclosure has a height direction (CH) equal to the first direction d1, and a width direction (CW) perpendicular to the first direction d1, and the length in the height direction (CH) is longer than the length in a width direction (CW). Further, the holes 500 may be formed by a plurality of numbers in the width direction of the electrode tab 110 perpendicular to the first direction d1.

Referring to FIGS. 2 and 3, the electrode tab 110 according to the exemplary embodiment of the present disclosure includes a first electrode tab portion 110a to which an electrode active material 105 is applied to the electrode plate 100, and a second electrode tab portion 110b to which the electrode active material 105 is not applied. The electrode tab includes a first portion 110a and a second portion 110b having different widths. The second portion 110b has a narrower width than the first portion 110a, and the second portion 110b may be a portion connected to the electrode lead 210. Right and left side edges of the first portion 110a may be formed in a curved line shape having a first curvature R. At this time, the hole 500 may be formed in the second portion 110b. The protrusion 130 may be a boundary that distinguishes the electrode plate 100 and the electrode tab 110.

FIG. 4 is a graph for comparing the maximum stress value in the tab according to a comparative example and an exemplary embodiment of the present disclosure. The graph of FIG. 4 shows the initial crack resistance based on the stress value in the electrode tab (maximum stress value for each case) applied when pulled by a certain length.

Referring to FIGS. 2 and 4, in the exemplary embodiment having the hole 500, looking at the relationship between the length in a width direction (CW) and the maximum stress value when the length in the longitudinal direction (CH) is constant (CH=3), the maximum stress value becomes the minimum as the length in a width direction (CW) is closer to 1 mm. When the length in a width direction (CW) increases more than 1.5 mm, the stress in the electrode tab shows a tendency to increase. The length in the longitudinal direction (CH) and the length in the width direction (CW), which will be described below, may refer to a radius in the longitudinal direction and a radius in the width direction, as shown in FIG. 2.

This is because when the elliptical hole 500 has a shape in which the length in the width direction (CW) is significantly smaller than the length in the longitudinal direction (CH), maximum stress concentration may occur at the lower end and the upper end of the hole 500. On the contrary, when the length in the width direction (CW) has a hole shape similar to or larger than the length in the longitudinal direction (CH), the maximum stress concentration occurs at the left side and right side ends and thus, the maximum stress value in the electrode tab increases.

Therefore, according to the exemplary embodiment of the present disclosure, the ratio of the length in the width direction (CW) to the length in the longitudinal direction (CH) may be 0.2 to 0.4333. In one exemplary embodiment, when the length in the longitudinal direction (CH) is 3 mm, the length CW in a width direction may be in the range of 0.6 mm to 1.3 mm. When the length CW in a width direction is 1 mm, the stress in the electrode tab is minimized while the stress is not concentrated in the hole 500.

Comparing with the stress level of the comparative example in which the hole is not provided, when the length in the width direction (CW) has a shape within a certain range, the stress in the electrode tab is low, and an electrode tab having a hole whose longitudinal direction is not a long axis has a high stress, providing the hole rather increases the stress in the electrode tab, so that when the strength of the electrode tab is constant, an initial crack can be easily generated.

Table 1 below shows the displacement to failure of the electrode tab according to the number of holes and the shape of the holes.

TABLE 1

| Type | Number of Hole | CH, mm | CW, mm | Displacement to failure (mm) |
|------|------|------|------|------|
| A | 0 | — | — | 1.51 |
| B | 1 | 3 | 1 | 1.83 |
| C | 1 | 3 | 3 | 0.97 |
| D | 2 | 3 | 1 | 2.20 |
| E | 2 | 3 | 3 | 1.09 |

Referring to Table 1, only when the length in the height direction (CH) of the hole 500 is longer than the length in the width direction (CW), there is no increase in stress due to the provision of the hole 500, which does not affect the initial crack resistance. When the width direction (CW) of the hole 500 is longer than the height direction (CH), crack resistance is reduced by the stress concentration of the hole due to the formation of holes, and on the contrary, uniformity is easily created, which may increase the risk of disconnection. In addition, when the crack progressed to a certain extent, in the comparative example, there was no change in the shape of the periphery of the crack part according to the progress of crack, whereas in the exemplary embodiment, new crack generation is required by a specific hole and so the energy required for crack generation is high, which may increase the level of displacement up to complete disconnection. Furthermore, in the case of a long hole in the width direction and not a specific hole according to the exemplary embodiment of the present disclosure, the stress is easily concentrated, and thus the level of energy required to create additional cracks may be relatively low, which may reduce the level of displacement until complete disconnection.

FIG. 5 is a plan view showing a modification of the exemplary embodiment of FIG. 2.

Referring to FIG. 5, it is substantially the same as the exemplary embodiment described in FIG. 2, but the hole 600 according to the exemplary embodiment of the present disclosure may be formed to extend not only to the second electrode tab portion 110b but also to the first electrode tab portion 110a. Except for the differences described above, all the contents described in FIG. 2 can be applied to the exemplary embodiment of the present disclosure.

Meanwhile, the electrode assembly according to an exemplary embodiment of the present disclosure may be used to form a pouch type secondary battery.

Although preferred exemplary embodiments of the present disclosure have been shown and described above, the scope of the present disclosure is not limited thereto, and numerous other modifications and exemplary embodiments can be devised by those skilled in the art, without deviating from the spirit and scope of the invention described in the appended claims. Further, these modified exemplary embodiments should not be understood individually from the technical spirit or perspective of the present disclosure.

DESCRIPTION OF REFERENCE NUMERALS

100: electrode plate
110: electrode tab
150: overlapping portion
210: electrode lead
105: electrode active material
120: boundary part
150: connection part
500, 600: holes

The invention claimed is:
1. An electrode assembly comprising:
a unit cell including a positive electrode plate, a separator and a negative electrode plate,
an electrode tab that is protruded from one of the positive electrode plate or the negative electrode plate, the electrode tab having a flat planar shape, and
an electrode lead that is connected to the electrode tab at an overlapping portion,
wherein a hole is formed extending perpendicularly to the flat planar shape of the electrode tab through a portion of the electrode tab adjacent to the overlapping portion of the electrode tab and the electrode lead, and
wherein the hole has an elliptical shape with a long axis extending in a longitudinal direction in which the electrode tab protrudes from the one of the positive electrode plate or the negative electrode plate.
2. The electrode assembly according to claim 1, wherein the electrode tab comprises a first electrode tab portion to which an electrode active material is applied, and a second electrode tab portion to which the electrode active material is not applied.
3. The electrode assembly according to claim 2, wherein the second electrode tab portion contains the overlapping portion that is connected to the electrode lead.
4. The electrode assembly according to claim 2, wherein right and left side edges of the first electrode tab portion each have a curved line shape.

5. The electrode assembly according to claim 2, wherein the hole is formed extending through the second electrode tab portion.

6. The electrode assembly according to claim 5, wherein a first portion of the hole is formed extending through the first electrode tab portion and a second portion of the hole is formed extending through the second electrode tab portion.

7. The electrode assembly according to claim 1, wherein the hole is a first hole, a second hole is formed extending through the portion of the electrode tab adjacent to the overlapping portion of the electrode tab and the electrode lead, and the first and second holes are spaced apart from one another in a width direction of the electrode tab perpendicular to a longitudinal direction in which the electrode tab protrudes from the one of the positive electrode plate or the negative electrode plate.

8. The electrode assembly according to claim 1, wherein a ratio of a length of the hole in a width direction to a length of the hole in a longitudinal direction is 0.2 to 0.4333, the width direction being perpendicular to a longitudinal direction in which the electrode tab protrudes from the one of the positive electrode plate or the negative electrode plate.

9. A secondary battery comprising the electrode assembly according to claim 1.

* * * * *